(12) United States Patent
Trimpe et al.

(10) Patent No.: US 8,322,799 B2
(45) Date of Patent: Dec. 4, 2012

(54) POWER BRAKE SYSTEM FOR A MOTOR VEHICLE

(75) Inventors: Robert Trimpe, Wessling (DE); Johann Baumgartner, Moosburg (DE); Robert Gruber, Pfaffing (DE); Aleksandar Pericevic, Munich (DE); Stephan Pitzing, Munich (DE); Steffen Geissler, Hallbergmoos (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 12/604,229

(22) Filed: Oct. 22, 2009

(65) Prior Publication Data

US 2010/0133051 A1 Jun. 3, 2010

Related U.S. Application Data

(63) Continuation of application No. PCT/EP2008/003069, filed on Apr. 17, 2008.

(30) Foreign Application Priority Data

Apr. 25, 2007 (DE) .......................... 10 2007 019 441

(51) Int. Cl.
B60T 8/44 (2006.01)
(52) U.S. Cl. ...................... 303/114.1; 303/9.61; 188/345
(58) Field of Classification Search .................. 188/345; 303/9.61, 15, 114.1, 114.2
See application file for complete search history.

(56) References Cited

U.S. PATENT DOCUMENTS

| | | | |
|---|---|---|---|
| 3,205,018 A | 9/1965 | Van Winsen et al. | |
| 3,927,915 A * | 12/1975 | Adachi | 303/114.2 |
| 4,057,301 A | 11/1977 | Foster | |
| 4,576,417 A | 3/1986 | Dobner | |
| 4,658,939 A | 4/1987 | Kircher et al. | |
| 5,390,992 A | 2/1995 | Walenty et al. | |
| 5,611,606 A | 3/1997 | Nell et al. | |
| 2006/0163941 A1 | 7/2006 | Von Hayn et al. | |
| 2010/0026083 A1 * | 2/2010 | Leiber et al. | 303/3 |

FOREIGN PATENT DOCUMENTS

| | | |
|---|---|---|
| DE | 1 555 203 | 3/1970 |
| DE | 1 940 632 A1 | 3/1971 |
| DE | 34 10 006 A1 | 9/1985 |
| DE | 43 35 769 C1 | 12/1994 |
| DE | 195 12 254 A1 | 10/1996 |
| DE | 101 50 803 A1 | 5/2003 |
| EP | 0 395 262 A2 | 10/1990 |
| EP | 0 734 929 B1 | 10/1996 |
| JP | 50-14979 | 2/1975 |
| WO | WO 00/66410 A1 | 11/2000 |
| WO | WO 2004/005095 A1 | 1/2004 |
| WO | WO 2006/111392 A1 | 10/2006 |

OTHER PUBLICATIONS

German Office Action dated Dec. 6, 2007 including English translation (Eight (8) pages).
International Search Report dated Jul. 29, 2008 including English translation (Ten (10) pages).
Examination Report issued Aug. 24, 2012 (six (6) pages).

* cited by examiner

*Primary Examiner* — Xuan Lan Nguyen
(74) *Attorney, Agent, or Firm* — Crowell & Moring LLP

(57) ABSTRACT

A brake system, in particular a dual circuit brake system, for a motor vehicle, includes brakes which can be activated by a brake pedal operatively connected to a brake servo. Each brake engages one wheel. The brake system is designed such that a brake servo is assigned to each brake of at least one brake circuit, and the brake servos can be activated by the brake pedal.

10 Claims, 3 Drawing Sheets

POWER BRAKE SYSTEM FOR A MOTOR VEHICLE

CROSS-REFERENCE TO RELATED APPLICATIONS

This application is a continuation of PCT International Application No. PCT/EP2008/003069, filed Apr. 17, 2008, which claims priority under 35 U.S.C. §119 to German Patent Application No. DE 10 2007 019 441.4, filed Apr. 25, 2007, the entire disclosures of which are herein expressly incorporated by reference.

BACKGROUND AND SUMMARY OF THE INVENTION

The invention relates to a power brake system, in particular a dual-circuit power brake system, for a motor vehicle.

In power brake systems with brakes that can be activated hydraulically, the force of the driver's foot on a brake pedal acts directly via a hydraulic circuit on a plurality of brakes, if appropriate with the assistance of a brake servo. Purely mechanical activation systems such as a Bowden cable are generally used as a parking brake. It is also known to activate the parking brake electromechanically.

An additional activation force, which relieves the driver, is applied in the brake servo. However, it is necessary to make sure that the braking effect continues to be ensured even if the brake servo fails.

The electrohydraulic brake systems with which wheel-specific control of the brakes is implemented by way of electromechanically activated plungers are known from the prior art. This brings about a considerable improvement in the controllability and, therefore, the effectiveness of the brakes. In the event of a failure of the electrical system or if other system-related faults occur, the entire protection of the braking effect has to be ensured by an additional brake circuit, which usually acts on the front axle and is activated mechanically or hydraulically.

Wheel brakes, which can be activated in a purely electromechanical fashion, are also known, but such wheel brakes have hitherto not been used exclusively owing to the stringent requirements made in terms of safety of the electrical power supply and the associated technical problems and high costs. Consideration is also being given to combining hydraulically activated brakes at the front axle with electromechanically activated brakes with an integrated parking brake function at the rear axle.

Electromechanical brakes, which are used as a parking brake and into which an electromechanical parking brake is integrated, provide, in this function, certain advantages over customary, hydraulically activated activation systems and additional purely mechanically acting activation systems. These advantages are, for example, improved operator control comfort and a smaller requirement for space in the passenger compartment due to the elimination of a hand brake lever.

The systems which are known by the term "brake-by-wire" and whose characteristic is the decoupling of the activation device and the transmission device, and which generally also use brakes which can be activated electromechanically have, despite the advantages, been used only rarely until now due to the abovementioned misgivings about safety.

The invention is based on the object of providing a power brake system which can be implemented easily and cost-effectively while satisfying the necessary safety aspects.

This object is achieved by a power brake system, in particular a dual-circuit power brake system for a motor vehicle, having at least one or more brake circuits which each have at least one or more brakes that are each assigned to a wheel of the vehicle. The brakes can be activated by way of a brake pedal to which a brake servo, which is operatively connected to the brake pedal, is assigned. In each case, a separate brake servo is assigned to each brake of at least one brake circuit of the brake system, which brake servos can be activated by way of the brake pedal. Moreover, the brake servos can be actuated independently of one another with respect to their brake boosting effect.

According to the invention, a brake system, in particular a dual-circuit power brake system, is provided for a motor vehicle, having at least one or more brake circuits that each have at least one or more brakes which are each assigned to a wheel of the vehicle, wherein the brakes can be activated by a brake pedal to which a brake servo, which is operatively connected to the brake pedal, is assigned. In each case, a separate brake servo is assigned to each brake of at least one brake circuit or a plurality of brake circuits of the brake system, which brake servos can be activated together, in particular simultaneously, by way of the brake pedal, but can preferably be activated independently of one another with respect to their brake boosting effect.

In principle, the invention provides a "brake-by-wire" system which permits selected braking of any connected wheel.

Use is preferably made here of electrohydraulic brake servos, which are arranged such that the force of the driver's foot acting on the brake pedal is distributed to all the brake servos uniformly or according to a predefined rule.

Each electrohydraulic brake servo has an actuator which is provided with an electromechanical drive. When the brake pedal is activated, an actuating force is added or subtracted via the actuator for each brake in order to set the distance which is predefined by a brake control system. In addition, direct activation of the brakes by the brake system without driver intervention is possible.

In this way, even in the event of a failure of the electrical energy or of the communication connection, the mechanics/hydraulic basic function of the brakes remains unaffected. The brake system, which is modified according to the invention, is therefore a "brake-by-wire" system providing maximum fail safety.

It is generally sufficient if the two brakes of the front axle of the motor vehicle have the described mechanical through-engagement since one brake circuit therefore remains fully active. The brakes of the second brake circuit, usually the brakes assigned to the brake circuit of the rear axle, can be embodied directly as electromechanical brakes, with direct engagement on the respective wheel. In this case, the electromechanical brakes of the rear axle can be equipped with an integrated parking brake function, as a result of which maximum functionality of the brake system, associated with a simple design which is less susceptible to faults and maximum fail safety, is achieved.

The central element of an actuator used herein is a threaded spindle, preferably a ball screw spindle, on a first end of which the brake pedal which is activated by the force of the driver's foot acts, while the applied force is transmitted to a master brake cylinder which is arranged at the other end of the spindle. A spindle nut, which engages around the threaded spindle, is driven by an electric motor, as a result of which, depending on the sense of rotation, an activation force is added to the force supplied by the brake pedal (or subtracted therefrom). Given corresponding dimensioning of the electric drive, the activation pressure which is generated by the brake cylinder can be boosted to a desired extent.

The advantage of an electrohydraulic brake servo is that the activation energy no longer has to be generated by additional pumps, but rather is made available directly by electrical means. The brake pressure of individual wheels is controlled independently, for example during ABS control processes, by way of additional valves and electrically driven hydraulic pumps.

In the embodiment according to the invention, there is a separate spindle system for each wheel. The spindle system permits wheel-specific intervention directly via the electromotive spindle drive. According to the invention, at least two of the spindle actuators are activated together by way of the brake pedal, wherein the force which is applied by the brake pedal is distributed among the spindles with the same predefined ratio in every working position of the individual spindles. The electric drive can add or subtract an actuating force at the respective spindle individually and according to demand.

The invention also provides a brake system in which each brake servo has an electromechanical drive which includes a ball screw spindle, around which an electrically drivable spindle nut engages. The ball screw spindle communicates with a hydraulic cylinder by means of which the respectively assigned brake can be activated hydraulically, wherein each of the brake servos is configured such that an activation of the brakes is possible solely by means of the ball screw spindle even if the electrically drivable spindle nut fails.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
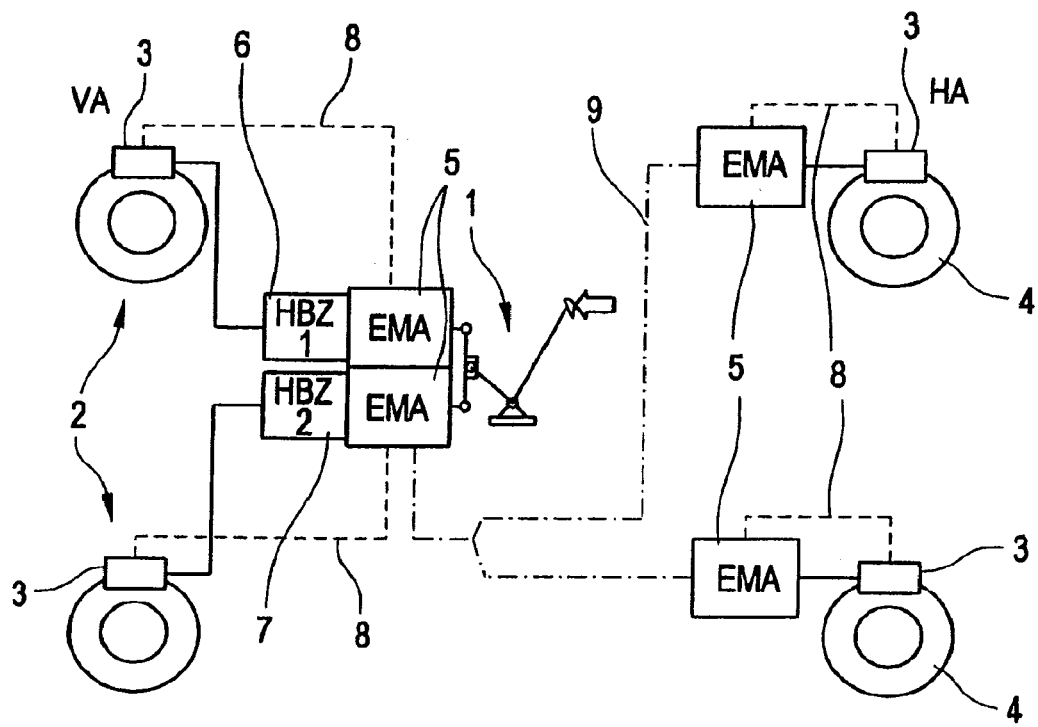
FIGS. 1 and 2 each show an inventive dual-circuit brake system with various modifications, in a schematic view.
Figure 2:
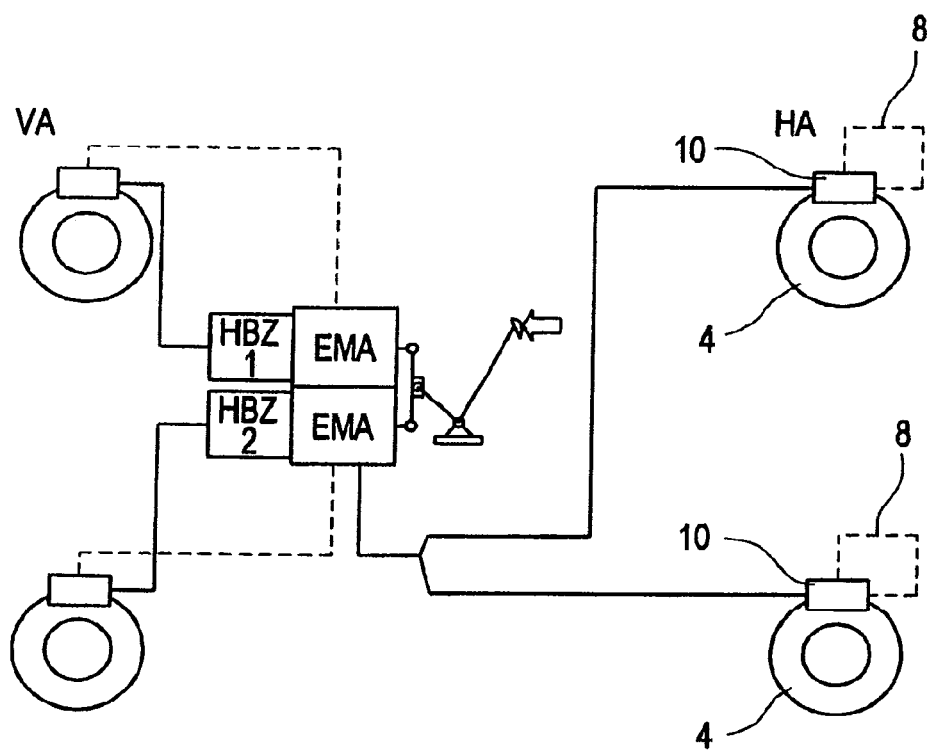

FIGS. 1 and 2 each show a dual-circuit brake system for a motor vehicle, having brakes 3, 10 which can be activated by way of a brake pedal 1, which is operatively connected to a brake servo 5. The brakes each engaging a wheel 2, 4.

In this context, a brake servo 5 is assigned to each brake 3 of at least one brake circuit—the front brake circuit with the wheels 2 in the exemplary embodiments according to FIGS. 1 and 2. The brake servos 5 can be activated simultaneously, but functionally independently of one another, by way of the brake pedal 1.

Figure 3:
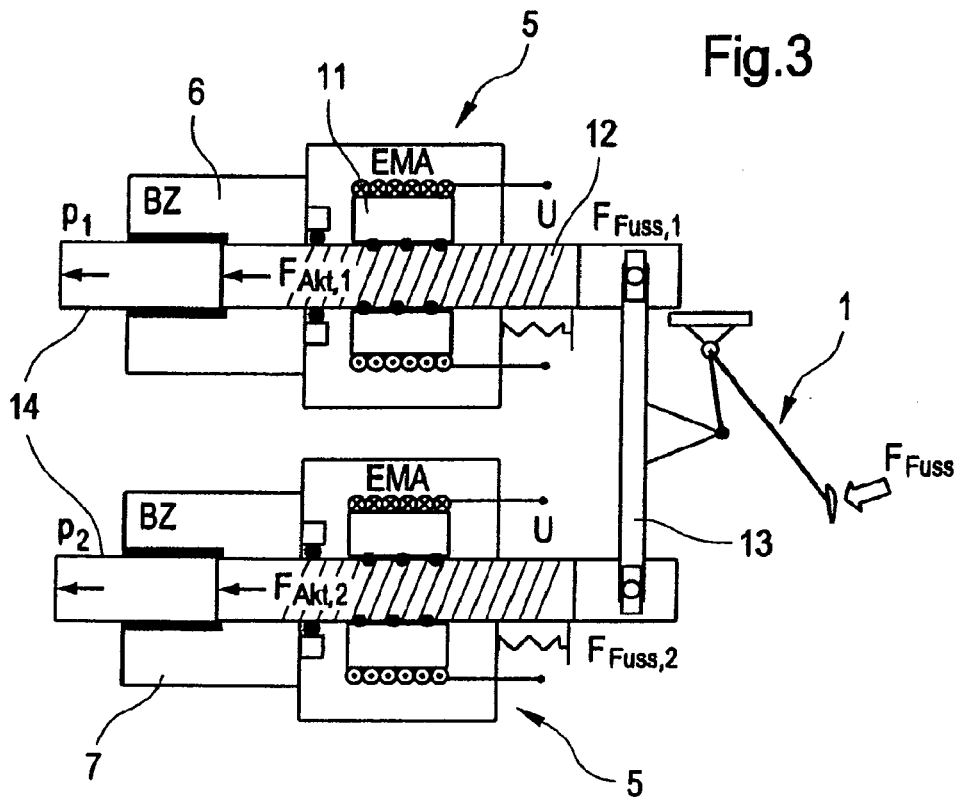
FIGS. 3 and 4 show a detail of the dual-circuit brake system, likewise in different functional positions in a schematic view.

Each of the two brake servos 5 has an electrohydraulic actuator which is provided with an electromechanical drive. This drive is embodied in particular in the form of a ball screw spindle 12, on one end of which spindle the brake pedal acts directly or via intermediately connected elements and around which spindle an electrically drivable spindle nut 11 engages (FIG. 3). The spindle communicates by its other end with a hydraulic cylinder 6 via which the respectively assigned brake 3 can be activated hydraulically. The actuation is preferably carried out by way of a superordinate control unit of the vehicle or of the brake system, for example via an EBS control unit or an ABS control unit which is connected to the brake servos (not illustrated here).

Each of the brake servos 5 is configured here in such a way that, by means of the ball screw spindle 12, even if the electrically drivable spindle nut 11 fails, the brakes can be activated solely by way of the brake pedal 1 via the ball screw spindle 12, which is rotated in the spindle nut 11 when the brake pedal is activated. Direct action of the brake pedal on the hydraulics, while bypassing the ball screw spindle 12, is not preferred but is possible.

These brake servos are therefore each configured in such a way that, even if the electrically drivable spindle nut 11 fails, activation continues to be possible by way of the ball screw spindle 12 via the brake pedal 1 by building-up a pressure in the hydraulic cylinder.

In the example shown in FIG. 1, a second brake circuit for braking the rear wheels 4 is also provided with brake servos 5 with electrohydraulic actuators in the same manner as in FIG. 3. These electrohydraulic actuators have electromechanical drives which are operatively connected to the brake pedal 1 via an electrical line 9. Here, the braking operation is carried out by way of brakes 3 which can be activated hydraulically, in the same way as the brakes 3 of the front brake circuit.

Wheel-specific conditions are transmitted via a sensor system 8 to the brake servos 5 for individually activating the electromechanical drive of the respective brake servo 5.

In contrast to the example in FIG. 1, the service braking operation and the parking braking operation of the rear wheels 4 are each carried out in the example shown in FIG. 2 by an electromagnetically activated brake 10, which is connected to the brake pedal 1 via the electrical line 9. This embodiment is cost-effective and particularly advantageous in functional terms since it combines the advantages of a hydraulic brake system with, as it were, the advantages of an electromechanical brake system.

Figure 4:
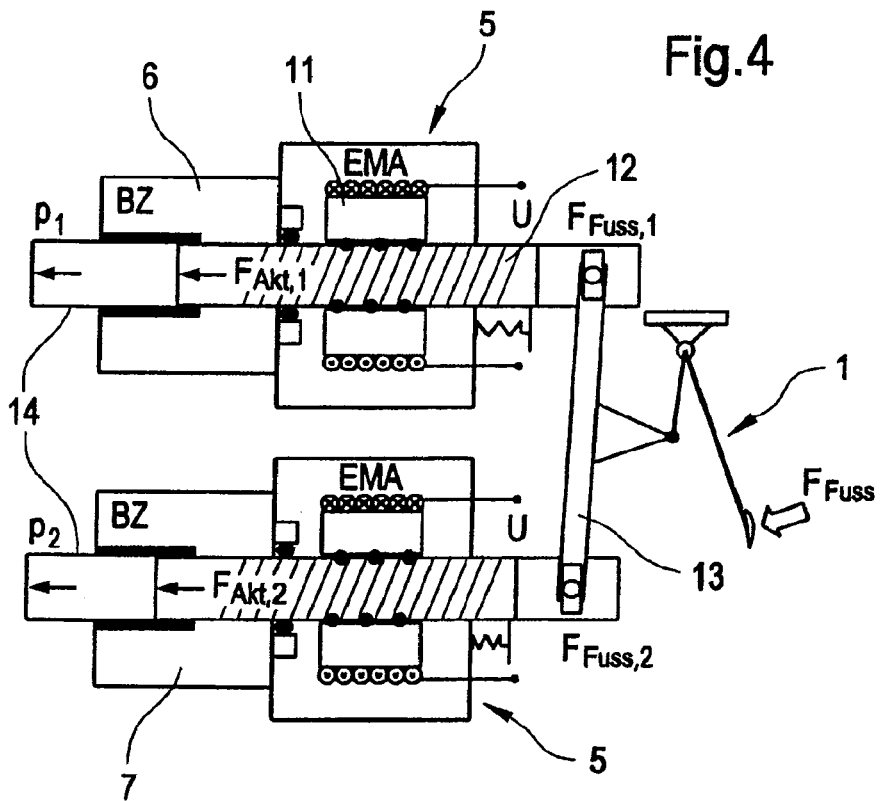

The detail shown respectively in FIGS. 3 and 4 is a power distribution system in which the activation lever of the brake pedal 1 transmits the force to the two spindles via a connected brake balance adjuster 13. The brake balance adjuster 13 is configured here such that even in the event of an unequal stroke position of the spindles 13, the same force is applied to both spindles. This provides a brake system in which the wheel-specific braking intervention is possible directly at all the connected wheels by way of the electromechanical brake actuator. If the power supply fails, at least one brake circuit, in the present example the front brake circuit, can be activated by the force of the driver's foot in such a way that the requested brake function is provided.

In FIG. 3, the brake servos 5 are illustrated in a rest position, while FIG. 4 shows a position in which a wheel-specific intervention occurs in which the spindles 12 assume different axial positions.

Figure 5:
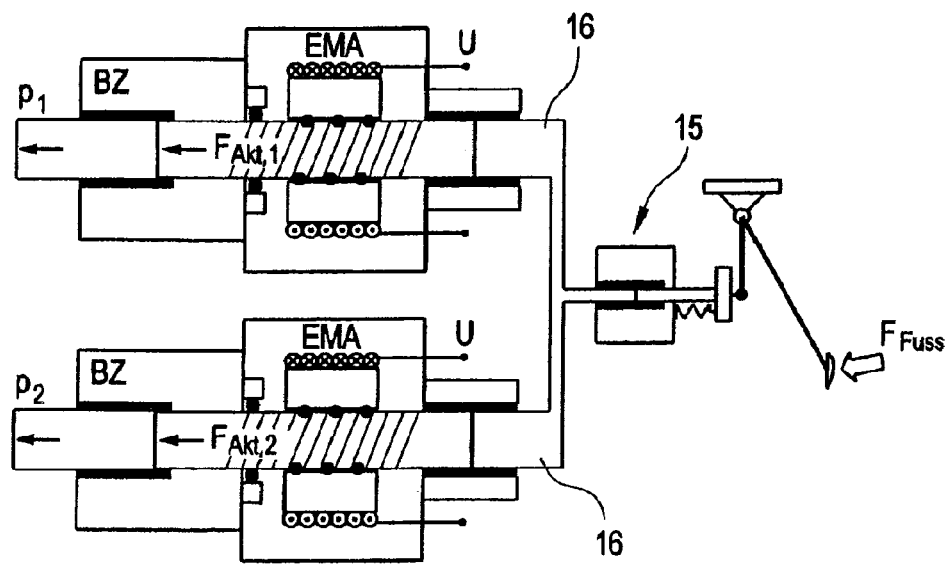
FIGS. 5 and 6, respectively, show further exemplary embodiments of the invention by way of a schematically illustrated detail.
Figure 6:
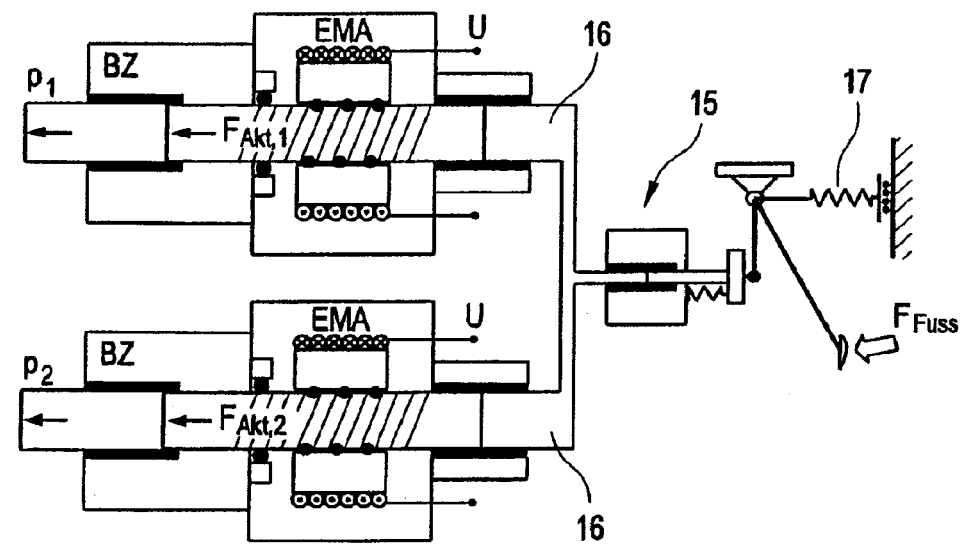

FIGS. 5 and 6 show a hydraulic force distribution in which the lever of the brake pedal 1 acts on a hydraulic piston 15 whose pressure is applied to two pistons 16 fitted onto the assigned ends of the spindles 12.

In a further embodiment of the invention corresponding to FIG. 6, the necessary foot activation force is reduced by a relieving spring. Here, use is made of the effect that a brake caliper springs open in a spring-elastic fashion when activated and the springing force is released again when the brake is released. Given a suitable arrangement of the spring 17, the force of the driver's foot which is necessary for activation can be effectively reduced.

An embodiment in which the electrohydraulic actuators are combined with associated plungers of relieving springs which are possibly present, and in which the necessary electrical and electronic components such as, for example, set-point value transmitters or the like, are combined with the brake pedal 1 to form one structural unit as a pedal module, is particularly advantageous.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A power brake system for a motor vehicle, comprising:
   one or more brake circuits, each brake circuit having at least one or more brakes that are each assigned to a respective wheel of the vehicle; and
   a separate brake servo assigned to each brake of the one or more brake circuits of the power brake system, said separate brake servos being activatable by way of a brake pedal operatively coupled to the brake servos,
   wherein
      each brake servo comprises an electromechanical drive including a ball screw spindle, around which an electrically drivable spindle nut engages,
      said ball screw spindle communicates with a hydraulic cylinder by which a respectively assigned brake is hydraulically activatable,
      each brake servo is operatively configured such that braking occurs via the ball screw spindle upon actuating the brake pedal even if the electrically drivable spindle nut is inoperative,
      a foot pedal of the brake pedal is connected to a hydraulic piston by which the ball screw spindle of the electromechanical drive is activatable via a connected piston by hydraulic pressure generated solely by the hydraulic piston by direct transfer of a force applied to the foot pedal to the hydraulic piston in response to application of the foot pedal, and
      the hydraulic pressure generated solely by the hydraulic piston acts on the connecting piston directly on an end of each ball screw spindle.

2. The brake system according to claim 1, wherein each brake servo is activatable independently of one another with respect to a brake boosting effect.

3. The brake system according to claim 2, wherein each brake servo includes an electrohydraulic actuator.

4. The brake system according to claim 1, wherein each brake servo includes an electrohydraulic actuator.

5. The brake system according to claim 4, wherein the brake pedal, together with the electrohydraulic actuator and electronic set point value transmitters are combined into one structural unit.

6. The brake system according to claim 1, wherein braking is adjusted on a wheel-specific basis when a pedal force of the brake pedal is applied uniformally or differentiated in a predefined manner.

7. The brake system according to claim 1, wherein a first brake circuit assignable to front wheels of the motor vehicle is operable by electrohydraulic brake servos, and wherein brakes of rear wheels of the vehicle are brakable by electromechanical brakes.

8. The brake system according to claim 7, wherein the electromechanical brakes of the rear wheels of the vehicle are operatively configured to function as electromechanical parking brakes.

9. The brake system according to claim 1, further comprising a relieving spring operatively coupled with the brake pedal.

10. The brake system according to claim 1, wherein the brake system is a dual-circuit power brake system.

* * * * *